US011592796B2

(12) United States Patent
Zimmerman et al.

(10) Patent No.: US 11,592,796 B2
(45) Date of Patent: Feb. 28, 2023

(54) WATER FOUNTAIN CONTROLLED BY OBSERVER

(71) Applicant: OUTSIDE THE LINES, INC., Anaheim, CA (US)

(72) Inventors: J. Wickham Zimmerman, Huntington Beach, CA (US); Michael J. Baldwin, Lake Forest, CA (US); Kevin A. Bright, Newport Beach, CA (US); Christopher J. Roy, Brea, CA (US); Allison N. Long, Newport Beach, CA (US)

(73) Assignee: Outside The Lines, Inc., Anaheim, CA (US)

( * ) Notice: Subject to any disclaimer, the term of this patent is extended or adjusted under 35 U.S.C. 154(b) by 371 days.

(21) Appl. No.: 16/928,645

(22) Filed: Jul. 14, 2020

(65) Prior Publication Data

US 2021/0018885 A1 Jan. 21, 2021

Related U.S. Application Data

(60) Provisional application No. 62/874,802, filed on Jul. 16, 2019.

(51) Int. Cl.

| G05B 19/042 | (2006.01) |
|---|---|
| G06T 7/292 | (2017.01) |
| G06T 7/70 | (2017.01) |
| B05B 17/08 | (2006.01) |
| B05B 12/16 | (2018.01) |
| G06N 3/02 | (2006.01) |
| G06V 40/20 | (2022.01) |

(52) U.S. Cl.
CPC ............ *G05B 19/042* (2013.01); *B05B 12/16* (2018.02); *B05B 17/08* (2013.01); *G06N 3/02* (2013.01); *G06T 7/292* (2017.01); *G06T 7/70* (2017.01); *G06V 40/20* (2022.01); *G05B 2219/2625* (2013.01); *G06T 2207/20084* (2013.01); *G06T 2207/30196* (2013.01)

(58) Field of Classification Search
CPC ......... A63G 31/007; G06V 10/82; G06N 3/02
See application file for complete search history.

(56) References Cited

U.S. PATENT DOCUMENTS

| 6,702,687 B1 | 3/2004 | Henry |
| 6,739,979 B2 | 5/2004 | Tracy |
| 7,445,550 B2 | 11/2008 | Barney et al. |

(Continued)

*Primary Examiner* — Clifford Hilaire
(74) *Attorney, Agent, or Firm* — Fulwider Patton LLP

(57) ABSTRACT

The present invention is a water fountain control system that utilizes cameras to analyze movements of a human subject, and actuates one or more water fountain controllers in response to the movements to create a display incorporating spray patterns of the flowing water. The camera system records video in real time and generates optical signals that are sent to a processor running software that assesses the dimension, position, stance, and/or motion of the human subject and converts the data into recognized classes of movements and/or poses. Once the processor identifies the type of movements and/or poses, it sends signals to the actuators of the water fountains to control the fountains in a manner that implements stored predetermined visual effects generated by the fountain to create a visual presentation to an audience.

10 Claims, 4 Drawing Sheets

(56) References Cited

U.S. PATENT DOCUMENTS

| | | |
|---|---|---|
| 8,550,928 B2 | 10/2013 | Hamelin |
| 8,821,304 B2 | 9/2014 | Ensing |
| 9,492,758 B2 | 11/2016 | Fisher |
| 2007/0093306 A1 | 4/2007 | Magee et al. |
| 2015/0041554 A1* | 2/2015 | Aguilera Sanchez .. B05B 17/08 239/18 |
| 2015/0217200 A1* | 8/2015 | Fisher ................... E04H 4/0006 472/128 |
| 2018/0018508 A1* | 1/2018 | Tusch .................... G06V 40/20 |
| 2019/0302880 A1* | 10/2019 | Averyanov .............. G06F 3/011 |

* cited by examiner

WATER FOUNTAIN CONTROLLED BY OBSERVER

CROSS-REFERENCES TO RELATED APPLICATIONS

This application claims priority from U.S. Provisional Patent Application No. 62/874,802, filed Jul. 16, 2019, the content of which is incorporated by reference herein in its entirety.

BACKGROUND

Water fountains have long been a staple of ornate landscaping and a source for tranquility. Early water fountains used a single spout and a single water pressure to generate a water movement pattern that was essentially static, in that the arc and trajectory of the flowing water remained unchanged during the fountain's entire operation. Water fountains eventually grew in complexity, adding second and third water streams to create a more complex, albeit static, water pattern. Then next generation water fountains used servo motors to move the spout(s) and create a dynamic water pattern, resulting in a spray movement pattern that is more interesting to the observer. In some locations, these dynamic water fountains were eventually put to music, lights, lasers, etc., and entire shows were centered about the operation of water fountains. The motors that controlled the spouts would later be programmed to perform predetermined arcs, swivels, loops, and the like, and with changing water pressures the fountains could create a myriad of spectacular images and sequences. The fountains at the Bellagio Hotel in Las Vegas, Nev., is a quintessential example of the pomp and complexity that can be attributed to a state-of-the-art water fountain show.

Water parks recognized the attraction and versatility of dynamic water fountain capabilities, where the possibilities are further enhanced by a participant being a prop in the display. Children chasing water projectiles, avoiding or catching water beads, running through water streams, etc., and the like can be equally entertaining and fascinating to watch. However, the water fountains remain largely a preprogrammed presentation, where the observer can react to the movements of the water but the sequence eventually repeats over and over as governed by its programming. The art lacks a feature whereby the observer could interact in real time with the fountain and alter the way the fountain interacts with the observer. The present invention pertains to a next generation of water fountains that address this lacking feature of the water fountain technology.

SUMMARY OF THE INVENTION

The present invention utilizes a camera system and other sensors to analyze movements of a human subject, and actuates one or more water fountains in response to the movements to create a display incorporating spray patterns of the flowing water. The camera system records video in real time and generates optical signals that are sent to a processor running software that assesses the dimension, position, stance, and/or motion of the human subject and converts the data into recognized classes of movements and/or poses. Once the processor identifies the type of movements and/or poses (e.g., dance moves, pledge pose, arm wave, etc.), it sends signals to the actuators of the water fountains to control the fountains in a manner that implements stored predetermined visual effects generated by the fountain to create a visual presentation to an audience. For example, a human subject can perform a movement such as "hopping like a bunny" or "waving to the crowd" and the camera system records the video, interprets the video as a type of human activity, categorizes the activity based on neural networks, and then sends commands to the water fountain actuators to, for example, mimic the subject's actions by manipulating the water fountains. The water fountains can be supplemented with additional effects such as music, lights, fire, fog, steam, lasers, and projected video on to a surface or the water surface to further enhance the presentation.

In a preferred embodiment, the system can detect if a human subject enters the area where the performance is to take place, and interrupts a predetermined water display with the real time, subject based water fountain display. The system also evaluates conditions within the performance theater, such as volume of the spectators and acts in accordance to a given set of rules that can be modified or changed depending on time, day, number of people, and the activities of the spectators and participants. The system activates the sequence to create a display based on the predetermined rules. Upon activation, the system may attempt to mimic the subject's movements using the water fountain(s) to achieve an amusing or dramatic presentation augmented by effects using fountain jets, nozzles, lights, fire, fog, steam, lasers, and projected video. Once the subject leaves the area, the system returns to the preprogrammed water fountain activities.

These and other features of the present invention will be best understood with reference to the accompanying drawings and the detailed description of the invention below.

DETAILED DESCRIPTION OF THE PREFERRED EMBODIMENTS

The present invention is a water fountain control system for use in creating a visual presentation using water spray patterns with controllable fountain nozzles that move in response to the motion a human subject. In one embodiment of the present invention, the system uses a stereo camera system to detect, evaluate, and classify the presence and movement of a human subject in the field of the camera system. Using multiple stereo-optic cameras, the system detects movement and determines if the movement is a person (as opposed to a bird, something blowing in the wind, or other random movement). If the system detects that the movement is a person, the movement is then interpreted by a program for such characteristics as gait, speed, height, position, etc., and a programmable logic controller (PLC,) or similar device generates a digital multiplex signal standard, DMX, or other control signals to the fountain effects. The signal is directed from the camera system to the PLC, which gives the signal priority if there is movement in the predefined area, but returns to the standard sequencing if the area is empty, the person is still, or nonresponsive. In response to the DMX signal, the controller causes various visual and auditory effects to occur, including fountain motion, activation of lighting, commencement of audio, and a variety of other related presentation phenomena.

In one preferred embodiment, the cameras capture an image of a subject from at least two different angles and compare them to each other to determine the distance of objects relative to the cameras. These images are used to generate a real-world five-dimensional model, where the five measured dimensions are position in the given area, length, width, height, speed, and time. The five dimensions are calculated and converted into a predetermined DMX channel and channel value. The designated predetermined area for the cameras determines the number of channels used and each channel controls the attribute of a fountain device, effect, or appliance. The pre-determined area is set out in a framework; and each point is attached to a channel. But if a subject inside the area does not move from a small space or stays in just one part of the whole area, the framework address assignment shifts to encompass the entire universe of addresses.

Figure 1A:
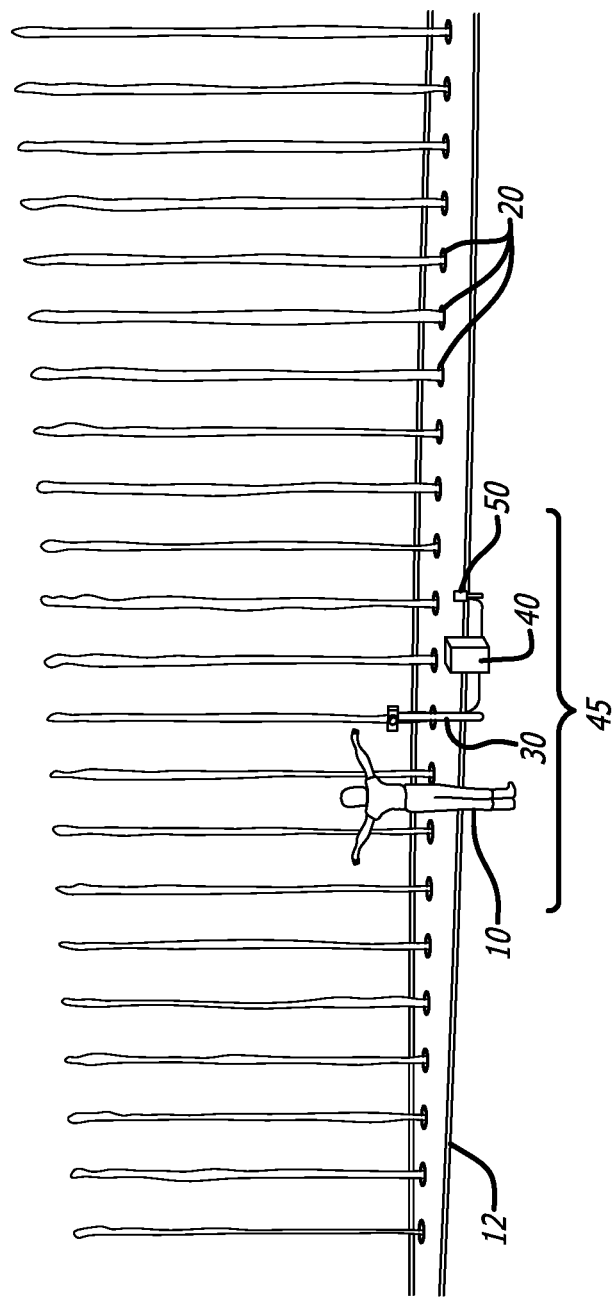
FIGS. 1A and 1B are perspective views of a subject interacting with the system of the present invention.
Figure 1B:
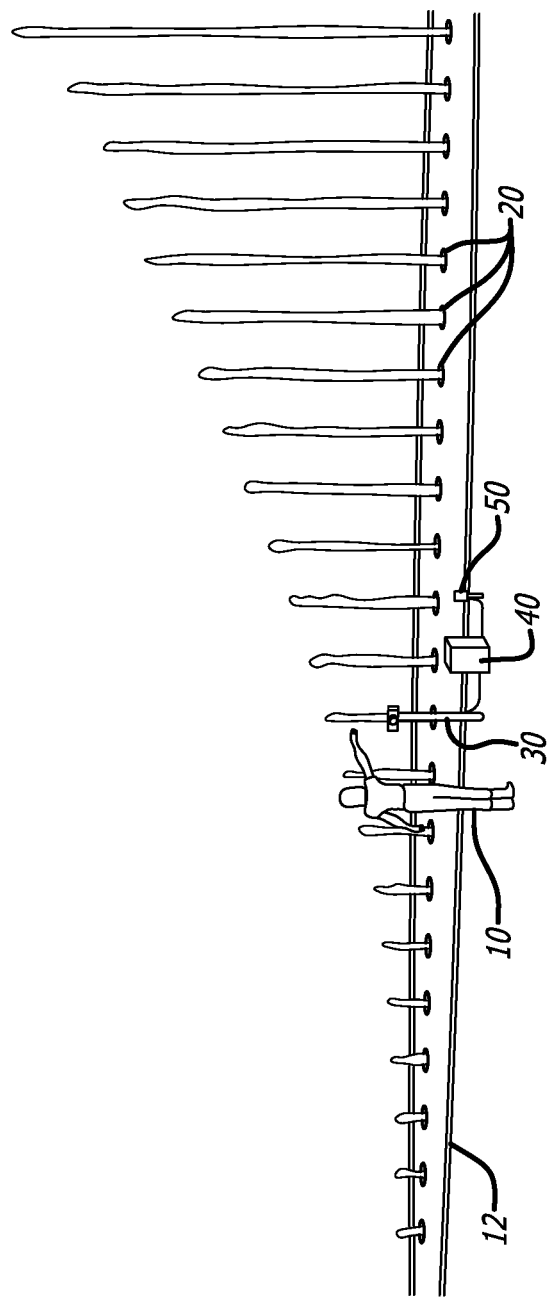

FIGS. 1A and 1B illustrate an example of the types of displays that can be created with the present invention. As subject 10 approaches a stage 12 that has a series of fountains 20 and camera system 30 that detects the subject 10. The camera system 30 is connected to a computer 40 that, in turn, operates the fountains, lights, speakers, fog emitters, and other appliances for the presentation. As the subject 10 enters the camera's area of perception 45, the camera forwards images or video to the computer, where the images or video are confirmed that the subject as a human and begins to interpret various characteristics, positions, and movements of the subject 10. The computer 40 may then exit a pre-programmed water display routine and convert to a subject-controlled response in order to engage with the subject 10 in various ways. For example, the camera system 30 may detect the height, velocity, and movements of the subject 10, and respond by sending a signal to a control box 50 tasked with varying the pressure, direction, and/or other attributes of the nozzles to simulate or coordinate with the motion of the subject 10. For example, in FIG. 1A the plurality of fountain stream heights is constant, corresponding to the constant height of the subject's outstretched arms. Conversely, in FIG. 1B the heights of the fountain's mimic or correspond with the subject's slanted outstretched arms, where the system construed the change in orientation of the subject's arm positions and altered the pressures of the fountains in order to create a display where the fountains' heights matched the subject's arms. This is but a single example of the many ways that the fountains can be controlled to adjust, cooperate with, mimic, or otherwise interact with a human subject.

The manner in which the system interprets the movement or presence of the subject 10 can be done in a number of ways. For example, a computer program may initially interrogate the subject 10 and compare the image or video of the subject with stored human behavior or activities, such as walking, dancing, arm waving, marching, etc., and then use the fountains, speakers, lights, etc. to create a visual and auditory presentation based on the interpreted movements of the subject in real time. Neural networks are beneficial in learning the movements of subjects and applying a level of confidence to the conclusions of the system's interpretation of the subject's movements, positions, etc. The system can then send signals to the hardware controlling the fountains to cause the fountains to generate spray patterns based on the subject's movements. One example is to have the fountains "mimic" the movements of the subject using the controllers of the fountains to adjust the height, speed, position, and other input from the camera system. After mimicking the participant for a period of time, the system may offer commands to the subject 10 to encourage further interaction with the system. In doing these several different effects, technologies and equipment are combined together to immerse the participant in interaction.

In order to carry out the coordination of the subject's movement with the fountain's display, there are several programs that run simultaneously. The water display may include various elements such as fountain jets, nozzles, lights, fire, fog, steam, lasers, projected video, etc., positioned to accommodate the area and location. The number of controllable devices is not limited nor is there minimum.

Figure 2:
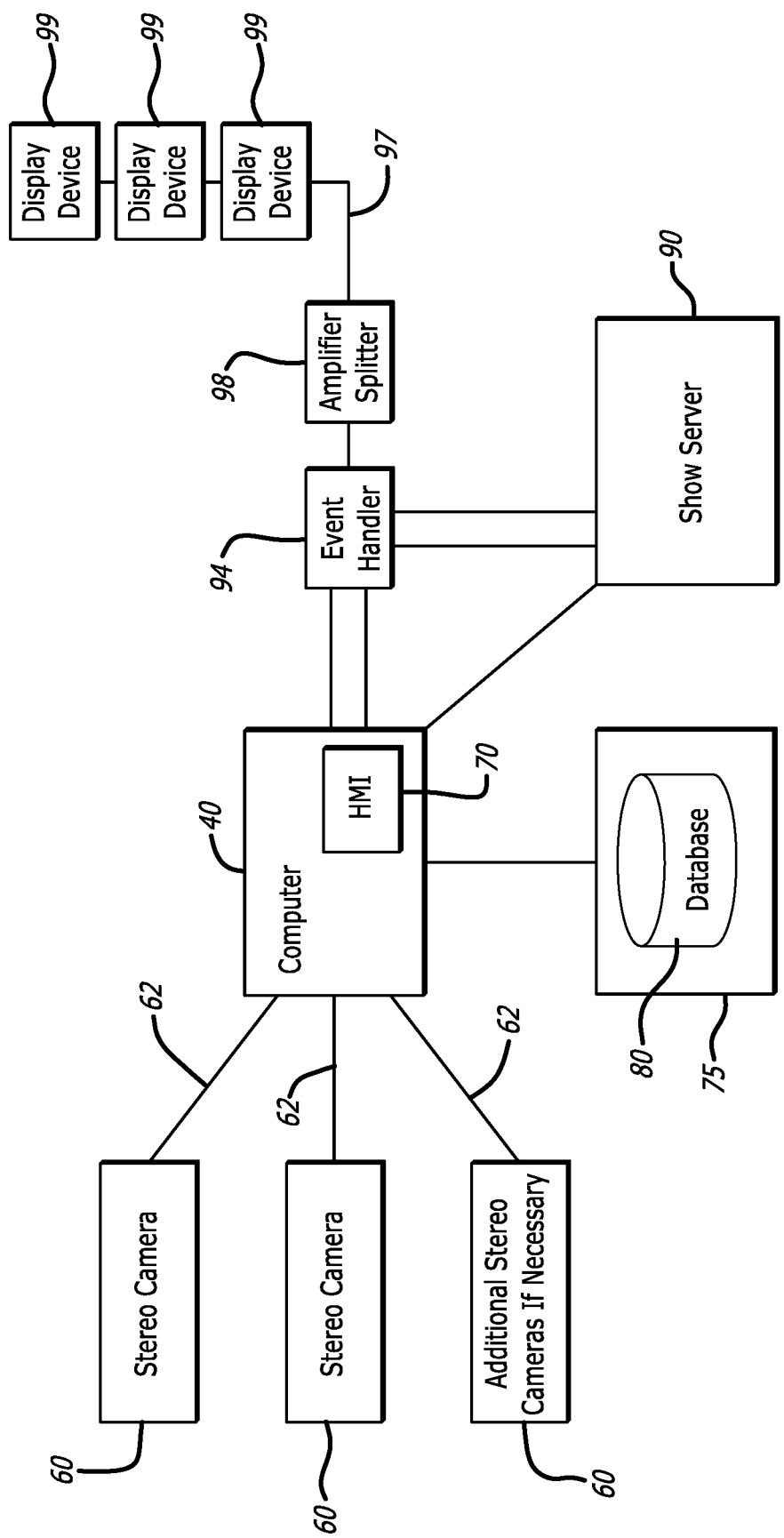
FIG. 2 is a schematic diagram of a first embodiment of the system of the present invention.

FIG. 2 illustrates a schematic for a system for carrying out the objects of the present invention. A plurality of stereo cameras 60 are arranged around the area of perception 45 for capturing video of a subject in or entering the area 45. The cameras 60 send video or image data to a computer 40 running an HMI software program 70. The computer 40 accesses a server 75 in which a database 80 is stored that corresponds to known human activity and fountain control programs that are implemented in response to the known human activity. The HMI software 70 receives the video data from the cameras 60 and identifies the human activity, and then sends a command to the server 75 to retrieve from the server 80 the set of controls that command the fountains to perform the selected sequences. These set of commands are forwarded to a show server 90, such as for example, the Syncronorm Showserver V3 U8 offered by Syncronorm GmbH of Arnsberg, Germany, which converts the commands into signal for the fountain controllers. These signals are transmitted to an event handler 94, which also receives information from the computer such as audio levels, subject characteristics, water pressures, etc., and generates the specific instructions for each display device 99, which may be fountains, lasers, strobe lights, fog machines, and the like. In some embodiments, a signal amplifier/splitter 98 is interposed in the bus 97 for signal strength integrity. When movement is detected by the cameras 60, data 62 is sent by each camera 60 to the computer 40 that controls the fountains and the special effects. The computer 40 accesses the database 80 on the server 75 that stores information about human observers, movements, height, velocity, etc. so that the movements detected from the cameras can be interpreted by the computer.

The human-machine interface, or "HMI" 70 is a neural network running a program that is used to interpret ordinary movements and actions of a human subject in the area 45. The computer 40 receives information from the database 80 and issues commands to the event handler for controlling the water fountain. Control may be emulating the person in the observer theater, such as producing a fountain of a common height, moving the fountain to follow the person, or manipulating the nozzles to mimic the person's movements. The system continues to mirror or otherwise engage with the participant to encourage others to join, to bring a crowd, and to bring enjoyment to the participant. In some embodiments, the fountains create a water formation that appears to be animated and responsive to the human subject. The amplifier/splitter 98 is needed to send the appropriate signals to the various devices, including the display devices that may be smoke generators, lasers, lighting effects, and sound effects.

Figure 3:
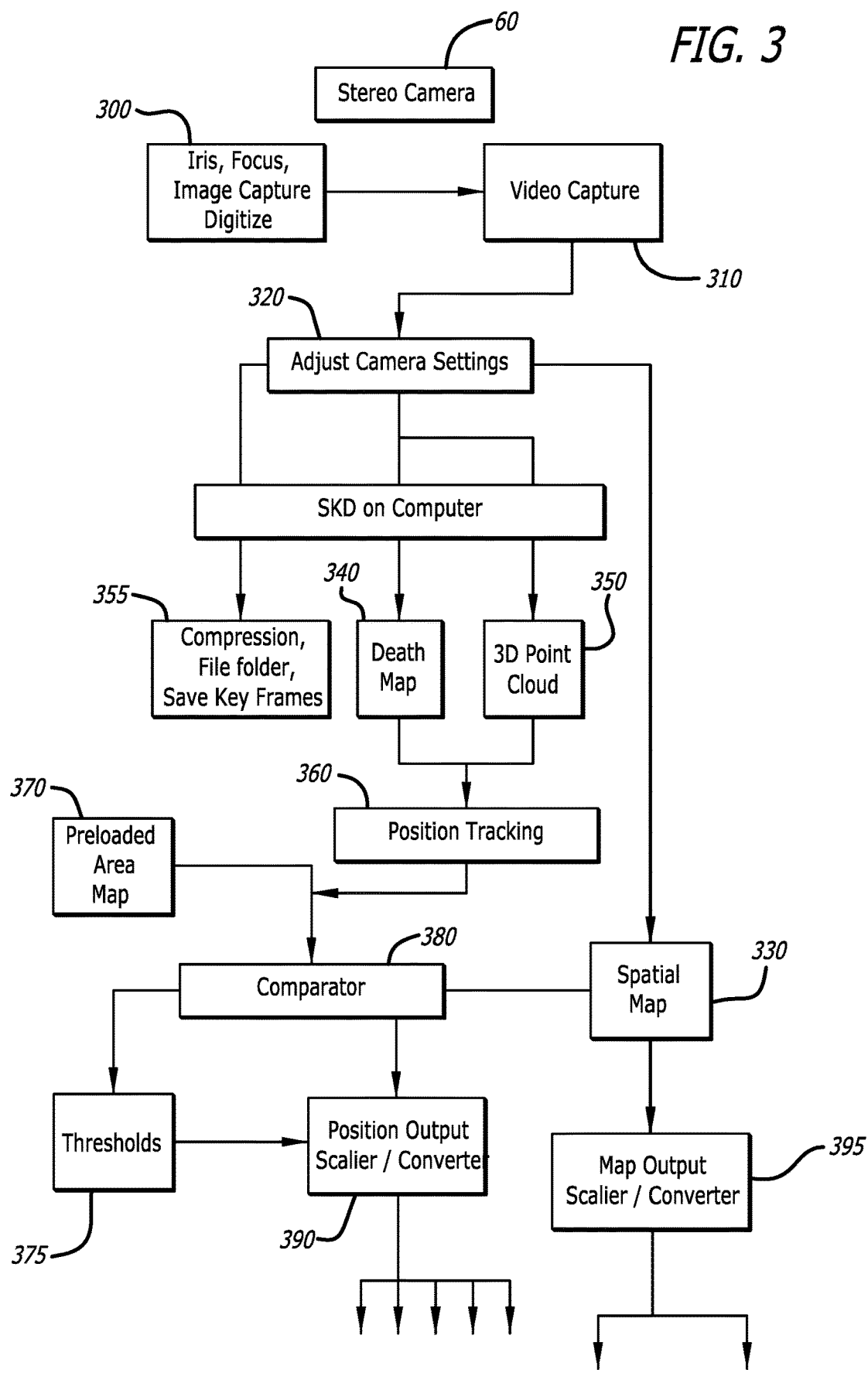
FIG. 3 is a flow chart of a first methodology for implementing a water fountain presentation.

FIG. 3 illustrates a flow chart for the data exchange that occurs in an embodiment of the present invention. The process begins at the plurality of stereo optic cameras 60 that detect and record video information. After an autofocus mechanism focuses the camera on the human subject (step 300), Video capture is performed in step 310 and a recheck of the focusing in step 310 may also be performed. The camera settings are adjusted in step 320 and sent to a spatial map program in the computer 40 in step 330. A depth map is generated from the video content in step 340 along with a 3D point cloud in step 350, and these outputs are delivered to a position tracking program in step 360. A preloaded area map is recalled in step 370 and thresholds are recalled in step 375, and the thresholds, preloaded map area, position tracking and spatial map is loaded in a comparator program in step 380. The computer then generates a position output scalar in step 390 and a map output scalar in step 395. These determinations are sent to the HMI for interpretation and analysis of the video content, which is then used to select the proper commands from the database 80. Some of the camera settings and image frames are stored in step 355 for analysis and future use. The foregoing allows for the establishment of a depth map of the area to be scanned and a three-dimensional scan of the area, or "cloud," while in parallel the data feed is compressed with key frames extracted and sent to the computer for analysis. The depth map and the three-dimensional cloud are combined to conduct position tracking of all moving objects in the cloud area, which the computer uses to determine where an object is in the three dimensional space, and this location is incorporated into a stored preloaded map.

The object's position and the pre-stored map used by the comparator program, which also utilizes the preset thresholds for determining the object's relevance (size, movement, etc.) and a spatial map developed by the cameras, to assimilate these data inputs and output the position output scalier/Converter. The outputs of the position converter are a channel percentage for each position of the map; it also outputs the levels of the same position as a numerical scale, and low or high. The map converter output sends a channel map, channel zone, and if the area is empty. Additionally, the spatial map outputs the map output scalier/converter so both the object's position is known generally and within the map's contour.

The position input is then fed to the AI logic controller, which directs the fountain to begin its water show presentation. The server calls up the selected pre-recorded show information, and the map output is also delivered to the fountain. The AI logic determines if the movement inside the channel map is interesting enough to follow along with the raw channel percentages and/or to manipulate that raw channel percentage or to ignore it all together. It will react in a childlike fashion whereas if the information being sent from the cameras isn't "interesting" enough than a program will be pulled up from the show server that makes the feature act, react, or display an "angry attitude." Conversely if the area is empty the feature runs a standard show pulled from the show server or it pulls a show that makes the feature appear to invite participants to come and investigate.

An RDM combiner and following system may be set up to detect faults in the feature equipment and to mute the equipment that is having a fault so there doesn't appear to have broken or non-operating parts and equipment.

HMI Suite

In a preferred embodiment of the present invention, an HMI program controls the operation of the system. The HMI program is comprised of multiple software packages that can be upgraded individually as opposed to deploying a single overarching package. Another advantage is the capacity to use the best language/framework for each component, as well as allowing the architecture to be configured to run across multiple networked devices. The first module is the activity prediction module where a subject's movements and positions are converted into video signals. Video is captured using, for example, a ZED camera mounted in a discrete pedestal. The cameras are physically separated by the hardware devices that runs the HMI Suite. The camera is connected to a NVIDIA Jetson Nano Developer Kit (https://developer.nvidia.com/embedded/jetson-nano-developer-kit) or alternative that capable of running multiple neural networks using NVIDIA's Maxwell GPU. The Activity Prediction module employs two neural networks, the first of which is used to predict the position of human body parts. The pose prediction neural network predicts human body part positions and converts these positions to data values. The data values are provided to the second neural network based on TensorFlow 2.0 or other software that is trained to predict human activities.

Figure 4:
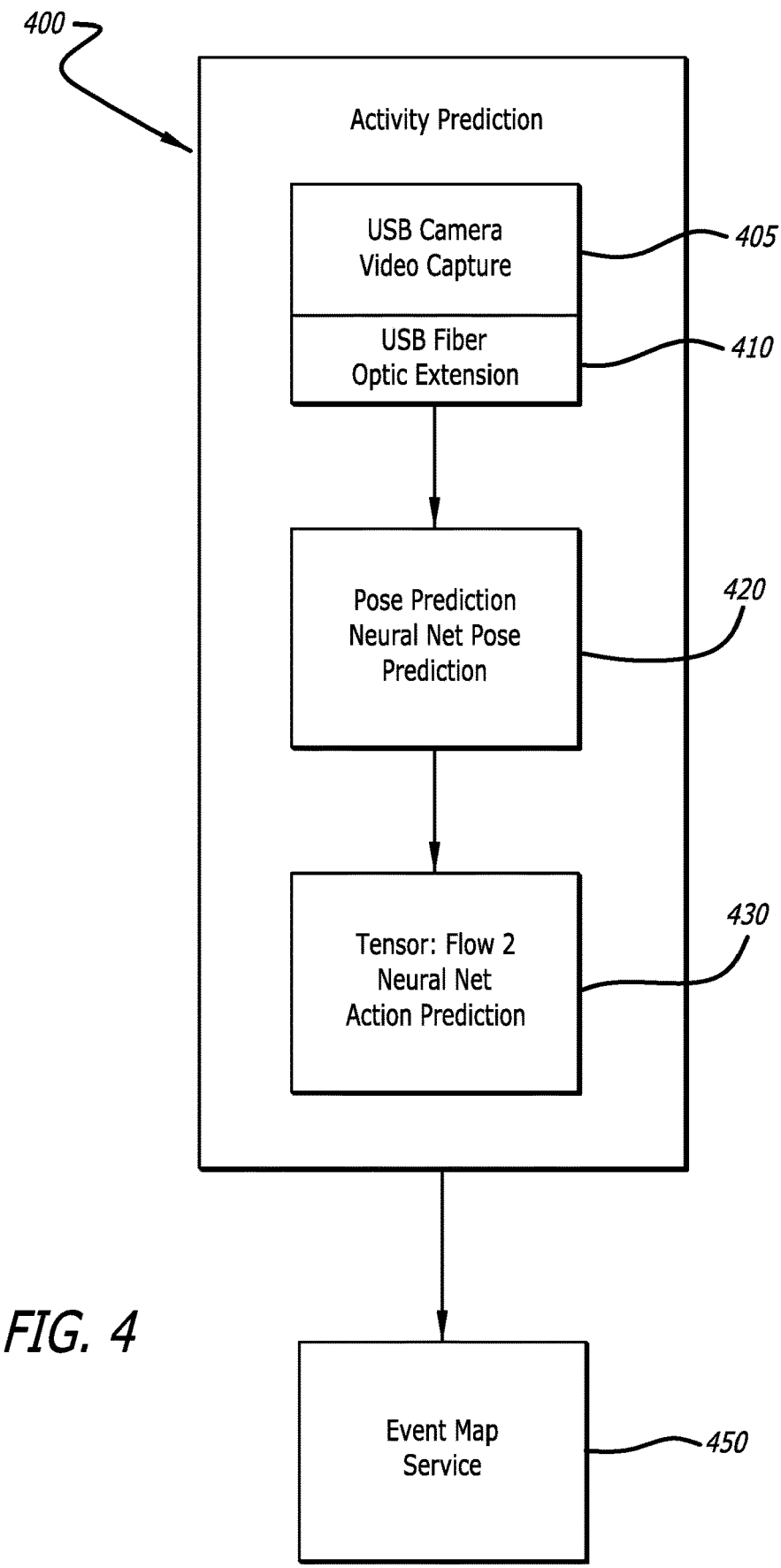
FIG. 4 is a schematic of an HMI Suite for controlling the system of the present invention.

The activity prediction module 400 (FIG. 4) feeds live video 405 to the pose prediction neural network 420 via a USB fiber optic cable 410. As prediction results are gathered, the data values are normalized to fit body proportions and distances from the camera(s). The normalized data values are then processed by the activity prediction neural network 430, and the results from this neural network is forwarded to the Event Map Service 450.

The Event Map Module 450 receives the results from the activity prediction neural network continually and in real time. Using the activity predictions, the state of the show server and other points of data the service follow preconfigured rules to determine the next state of the show server. The following points of data will be evaluated events:

Activities Prediction (1 or more)
Time of Day
Day of Week
Show State
Current Show
The following actions will be available:
Start Show
Stop Show
Wait after Show
Stop Scheduler
Start Scheduler The rules are configured using a software package that allows the user to configure events and actions. This configuration can then be deployed to the Event Map Services via the Configuration Update Service.

The Show Server Controller is the interface to the show servers. Dependence and OASE WECS II show servers are examples of show servers that are compatible with the present invention. The Show Server Controller supports multiple show servers, where each show server has different integration options and the Show Server Controller adds support as needed. Initially, the Show Server Controller supports the WECS II show server via the WECS II Web server Extension (https://www.oase-livingwater.com/en_EN/fountains-lakes/products/p/wecs-ii-5121024-web-server-extension.1000173518.html). The controller supplies the current state of the show server to the Event Map Service. This state is used to process rules. The controller then attempts to process actions sent from the Event Map Service.

The last module is the Configuration Update Service. Updates to the HMI Suite may be required under the following conditions:

New versions of the software packages developed
Activity predictions are added or improved
Configuration updates for the Event Map Service The Configuration Update Service runs in the background and checks updates that are required by the specific installation. For instance, it is possible for an installation in Atlanta to run one version of the Activity Prediction software and an installation in Los Angeles to run another.

While updates to the HMI Suite should be fast, updates can be scheduled for a specific date and time. Prior to updates starting, the Event Map Service will be notified and will start the scheduler on the show server. Once the updates are complete, the Event Map Service is notified to continue normal operation.

While various embodiments have been described and/or depicted in connection with the present invention, the invention is not limited to these descriptions and embodiments. A person of ordinary skill in the art would readily recognize various modifications, substitutions, and alterations to the embodiments disclosed and described above, and the present invention is intended to include all such modifications, substitutions, and alterations. Thus, no description or drawing of the invention should be deemed limiting or exclusive unless expressly stated.

We claim:

1. A system for interpreting movements of a human within an area, and commanding a water fountain system to perform a set of instructions in response to the movements, comprising:
   a plurality of water fountains operated by control mechanisms;
   a plurality of cameras for capturing human movements within the area;
   a computer in communication with the plurality of cameras for receiving video signals from the plurality of cameras representative of the human movements;
   a database accessible by the computer, the database storing instructions for operating a plurality of water fountains;
   a neural network running on the computer adapted to receive the video signals and select a set of instructions from the database in response to an interpretation of the human movements represented by the video signals;
   a program controller for receiving the set of instructions from the computer and commanding the control mechanisms of the respective fountains to operate according to the set of instructions;
   wherein the control mechanisms adjust a display of the plurality of water fountains based on a pose, position, and movement of the human to mimic at least one of said pose, position, and movement.

2. The system of claim 1, wherein the plurality of cameras are stereo-optic cameras.

3. The system of claim 1, further comprising a laser controlled by the set of instructions.

4. The system of claim 1, further comprising an audio system controlled by the set of instructions.

5. The system of claim 1, further comprising a fog machine controlled by the set of instructions.

6. The system of claim 1, further comprising lights controlled by the set of instructions.

7. The system of claim 1, wherein the system determines a set of conditions, and initiates the set of instructions responsive to the movements of the human only when the set of conditions are satisfied.

8. The system of claim 1, wherein the neural network includes a pose prediction program.

9. The system of claim 1, further comprising a program for determining an area map for assessing the movements of the human.

10. The system of claim 1, further comprising a program for position tracking of the human.

* * * * *